(No Model.)
J. B. PARKER.
SEED PLANTER.
No. 332,746. Patented Dec. 22, 1885.
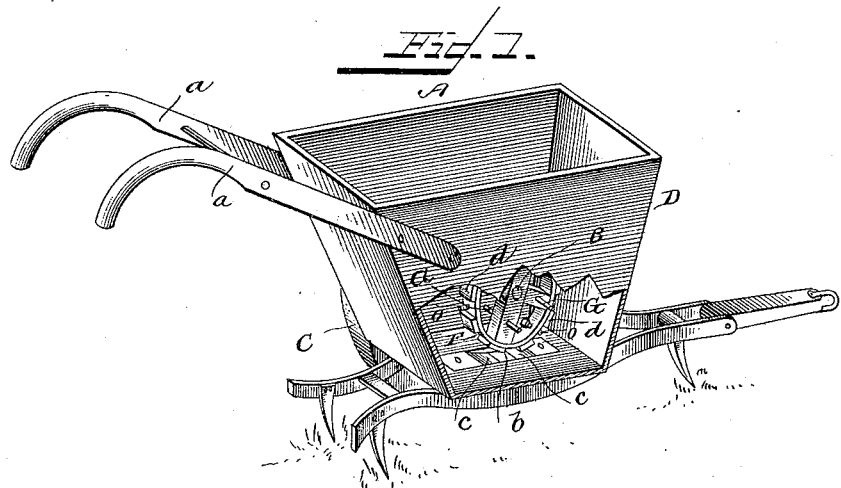
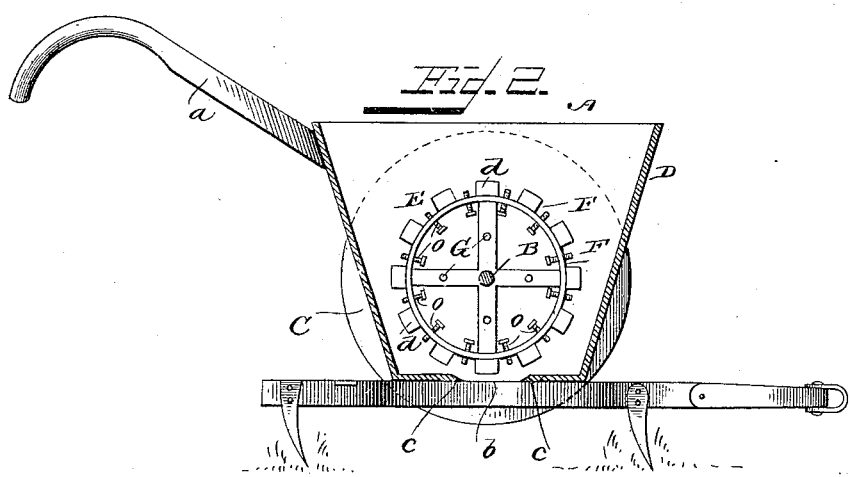
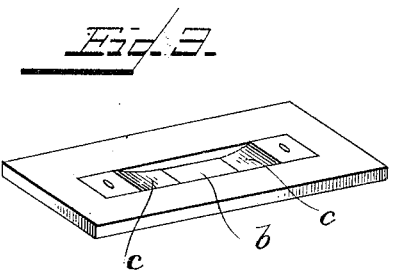
WITNESSES
INVENTOR
J. B. Parker.
By C. A. Snow & Co.
Attorneys

UNITED STATES PATENT OFFICE.

JAMES BENJAMIN PARKER, OF MEMPHIS, ALABAMA.

SEED-PLANTER.

SPECIFICATION forming part of Letters Patent No. 332,746, dated December 22, 1885.

Application filed May 9, 1885. Serial No. 164,979. (No model.)

*To all whom it may concern:*

Be it known that I, JAMES BENJAMIN PARKER, of Memphis, in the county of Pickens and State of Alabama, have invented a new and useful Improvement in Seed-Planters for Planting Cotton-Seed, Corn, Peas, &c., in Drills, of which the following is a specification.

My invention relates to an improvement in seed-planters for planting cotton-seed, corn, peas, &c., in drills, the object of the invention being to provide a cheap, simple, and durable machine for this purpose, and one that will be thoroughly effective in its operation.

With these ends in view the invention consists in the improved construction and combinations of parts hereinafter fully described, and pointed out in the claims.

In the drawings, Figure 1 is a perspective view of my improved seed-planter. Fig. 2 is a longitudinal vertical section of the same, and Fig. 3 is a detail view of the bottom of the seed-hopper.

A represents my improved planter.

D represents the hopper thereof, of the usual form, and secured to said hopper are handles a.

B represents a shaft passing through the hopper, and upon the ends of said shaft are mounted carrying-wheels C. An opening, b, is made in the bottom of the hopper, and the ends of said opening are beveled or cut off obliquely, as shown at c.

Upon the carrying-wheel shaft B, within the hopper, is mounted a distributer seed disk or wheel, E. This disk or wheel is provided on its periphery, at suitable intervals, with blocks d, the spaces between which form seed-cups F. In lieu of this construction I may recess or slot the periphery of the disk at suitable intervals to form the seed-cups, either arrangement attaining the end in view. It will thus be seen that when the machine is moved forward the seed-disk will be revolved and the seed dropped.

For agitating the seed I have provided a series of pins, G. These pins are located in openings formed in the wheel near its periphery, and project laterally beyond the sides of the wheel.

O represents screw-bolts passing through the rim of the distributing wheel or disk and entering the recesses, slots, or spaces forming the seed-cups, said bolts being for the purpose of regulating the quantity of seed to be dropped.

At the front end of the machine is arranged the usual draft-beam and furrow-opener, while in rear of the hopper are arranged the ordinary coverers.

It will be seen from the above description, taken in connection with the annexed drawings, that the seed-dropping disk and agitator are combined in one wheel, and that by the construction described all gearing is dispensed with.

Having thus described my invention, I claim—

1. The combination, with the hopper having the opening in its bottom, and the shaft having the carrying-wheels mounted thereon and passing through the hopper, of a disk mounted on the shaft within the hopper, a series of slots or spaces on the peripheral face of the seed-disk at intervals apart, a series of radially-arranged laterally-projecting pins or projections on the seed-disk, and adjusting devices, such as screw-bolts, located in the slots or spaces, for regulating the quantity of seed to be dropped, substantially as set forth.

2. The hopper having an opening formed in its bottom, the walls of which opening are beveled, as at b, in combination with the shaft having the carrying-wheels mounted thereon, a wheel or disk mounted on the shaft within the hopper, and having its periphery provided with a series of slots or open spaces at intervals apart, a series of laterally-extending pins provided on the spokes of the wheel or disk, and screw-bolts working through the periphery of the latter, and having one end extending into the slots or spaces, so as to regulate the quantity of seed received within the latter, as set forth.

JAMES BENJAMIN PARKER.

Witnesses:
THOS. WINDHAM,
JOHN T. MONCHETT.